(12) United States Patent
Price, III

(10) Patent No.: US 6,851,049 B1
(45) Date of Patent: Feb. 1, 2005

(54) METHOD AND APPARATUS FOR FACILITATING SECURE ANONYMOUS EMAIL RECIPIENTS

(75) Inventor: William F. Price, III, Los Altos, CA (US)

(73) Assignee: PGP Corporation, Palo Alto, CA (US)

( * ) Notice: Subject to any disclaimer, the term of this patent is extended or adjusted under 35 U.S.C. 154(b) by 851 days.

(21) Appl. No.: 09/677,292

(22) Filed: Oct. 2, 2000

(51) Int. Cl.[7] .......................... H04L 9/00; G06F 11/30
(52) U.S. Cl. ...................... 713/150; 713/171; 713/180; 713/200; 713/201; 380/30; 380/282; 380/286; 705/74
(58) Field of Search ................................. 713/160, 171, 713/200, 201, 152; 709/202, 206; 705/74; 380/24, 25, 28, 30, 286; 235/375, 380

(56) References Cited

U.S. PATENT DOCUMENTS

| | | | | |
|---|---|---|---|---|
| 5,081,678 A | * | 1/1992 | Kaufman et al. | 713/161 |
| 5,214,702 A | * | 5/1993 | Fischer | 380/30 |
| 5,481,613 A | * | 1/1996 | Ford et al. | 380/30 |
| 5,812,670 A | * | 9/1998 | Micali | 705/74 |
| 5,852,665 A | * | 12/1998 | Gressel et al. | 380/30 |
| 5,958,005 A | * | 9/1999 | Thorne et al. | 709/202 |
| 6,026,166 A | * | 2/2000 | LeBourgeois | 713/156 |
| 6,161,129 A | * | 12/2000 | Rochkind | 709/206 |
| 6,170,744 B1 | * | 1/2001 | Lee et al. | 235/380 |
| 6,272,632 B1 | * | 8/2001 | Carman et al. | 713/168 |
| 6,289,105 B1 | * | 9/2001 | Murota | 380/286 |
| 6,314,190 B1 | * | 11/2001 | Zimmermann | 380/282 |
| 6,401,203 B1 | * | 6/2002 | Eigeles | 713/156 |
| 6,442,687 B1 | * | 8/2002 | Savage | 713/156 |
| 6,584,564 B2 | * | 6/2003 | Olkin et al. | 713/152 |
| 6,591,291 B1 | * | 7/2003 | Gabber et al. | 709/206 |
| 6,608,888 B2 | * | 8/2003 | Bedingfield et al. | 379/88.22 |
| 6,611,812 B2 | * | 8/2003 | Hurtado et al. | 705/26 |
| 6,628,786 B1 | * | 9/2003 | Dole | 380/44 |
| 6,640,301 B1 | * | 10/2003 | Ng | 713/156 |
| 6,675,153 B1 | * | 1/2004 | Cook et al. | 705/74 |
| 2002/0007453 A1 | * | 1/2002 | Namovicher | 713/155 |

* cited by examiner

Primary Examiner—Emmanuel L. Moise
(74) Attorney, Agent, or Firm—Cooley Godward LLP

(57) ABSTRACT

One embodiment of the present invention provides a system that facilitates secure transmission of an email message to anonymous recipients without divulging the identities of the anonymous recipients. This system constructs an email message by identifying recipients of the email message. These recipients can include known recipients, who can be identified by examining the email message, and anonymous recipients, who cannot be identified by examining the email message. The system also generates a session key for the email message, and encrypts a body of the email message with the session key. The system also creates a recipient block for the email message that contains an entry for each recipient of the email message. Each entry in this recipient block contains the session key encrypted with a public key associated with the recipient to form an encrypted session key, so that only a corresponding private key held by the recipient can be used to decrypt the encrypted session key. Each entry additionally contains an identifier for the associated public key, so that each recipient can determine whether the recipient possesses a corresponding private key that can decrypt the encrypted session key. These identifiers are constructed so that identifiers for public keys belonging to known recipients are statistically unique, and identifiers for public keys belonging to anonymous recipients are not statistically unique. Finally, the system sends the email message to the recipients.

27 Claims, 2 Drawing Sheets

METHOD AND APPARATUS FOR FACILITATING SECURE ANONYMOUS EMAIL RECIPIENTS

BACKGROUND

1. Field of the Invention

The present invention relates to computer security and electronic mail. More specifically, the present invention relates to a method and an apparatus for facilitating transmission of an encrypted electronic mail message to anonymous recipients without divulging the identities of the anonymous recipients.

2. Related Art

The advent of computer networks has led to an explosion in the development of applications that facilitate rapid dissemination of information. In particular, electronic mail (email) is becoming the predominant method for communicating textual and other non-voice information. Using email, it is just as easy to send a message to a recipient on another continent as it is to send a message to a recipient within the same building. Furthermore, an email message typically takes only minutes to arrive, instead of the days it takes for conventional mail to snake its way along roads and through airports.

One problem with email is that it is hard to ensure that sensitive information sent through email is kept confidential. This is because an email message can potentially traverse many different computer networks and many different computer systems before it arrives at its ultimate destination. An adversary can potentially intercept an email message at any of these intermediate points along the way.

One way to remedy this problem is to "encrypt" sensitive data using an encryption key so that only someone who possesses a corresponding decryption key can decrypt the message. (Note that for commonly used symmetric encryption mechanisms the encryption key and the decryption key are the same key.) A person sending sensitive data through email can encrypt the sensitive data using the encryption key before it is sent through email. At the other end, the recipient of the email can use the corresponding decryption key to decrypt the sensitive information.

Encryption works well for a message sent to a single recipient. However, encryption becomes more complicated for a message sent to multiple recipients. This is because encryption keys must be managed between the sender and the multiple recipients.

Conventional mail protocols, such as the Pretty Good Privacy (PGP) protocol, send mail to multiple recipients by encrypting a message with a session key (that is randomly selected for the message) to form an encrypted message. The session key is then encrypted with the public key of each of the recipients to form a set of encrypted keys. This set of encrypted keys is sent with the encrypted message to all of the recipients. Each recipient uses one of its private keys to decrypt an encrypted session key and then uses the session key to decrypt the encrypted message.

Note that key identifiers for the public keys that were used to encrypt the encrypted session keys are sent along with the encrypted session keys, so that each recipient can determine whether or not the recipient possesses a corresponding private key that can decrypt the encrypted session key. These identifiers are typically generated by computing as a hash of the public key.

Unfortunately, the key identifiers can also identify a recipient of an email message to other recipients of the email message. This complicates the process of sending an encrypted email message to anonymous recipients, because the recipients of the email message can determine the identities of the anonymous recipients by examining the key identifiers for the anonymous recipients.

What is needed is a method and an apparatus for facilitating transmission of encrypted email to anonymous recipients without divulging the identities of the anonymous recipients.

SUMMARY

One embodiment of the present invention provides a system that facilitates secure transmission of an email message to anonymous recipients without divulging the identities of the anonymous-recipients. This system constructs an email message by identifying recipients of the email message. These recipients 0 can include known recipients, who can be identified by examining the email message, and anonymous recipients, who cannot be identified by examining the email message. The system also generates a session key for the email message, and encrypts a body of the email message with the session key. The system also creates a recipient block for the email message that contains an entry for each recipient of the email message. Each entry in this recipient block contains the session key encrypted with a public key associated with the recipient to form an encrypted session key, so that only a corresponding private key held by the recipient can be used to decrypt the encrypted session key. Each entry additionally contains an identifier for the associated public key, so that each recipient can determine whether the recipient possesses a corresponding private key that can decrypt the encrypted session key. These identifiers are constructed so that identifiers for public keys belonging to known recipients are statistically unique, and identifiers for public keys belonging to anonymous recipients are not statistically unique. Finally, the system sends the email message to the recipients.

In one embodiment of the present invention, identifiers for public keys belonging to anonymous recipients provide only enough information to exclude a large percentage of all possible corresponding private keys from being able to decrypt the body of the email message.

In one embodiment of the present invention, an identifier for a public key is formed by creating a hash of the public key.

In one embodiment of the present invention, an identifier for a public key belonging to an anonymous recipient is additionally modified so the identifier is not statistically unique. In this way, the identifier cannot be used to uniquely identify the anonymous recipient. However, a recipient can use the identifier to exclude a large percentage of all possible corresponding public keys held by the recipient from matching the identifier.

In one embodiment of the present invention, prior to encrypting the body of the email message, the system includes a checksum into the body of the email message, so that a recipient can examine the checksum to verify that the correct private key was used in decrypting the email message.

One embodiment of the present invention provides a system that facilitates secure transmission of an email message to anonymous recipients without divulging the identities of the anonymous recipients. This system operates by receiving the email message at a recipient. This email message includes a message body that has been encrypted with a session key. It also includes a recipient block that contains an entry for each recipient of the email message.

Each of these entries contains the session key encrypted with a public key associated with the recipient to form an encrypted session key. Each entry additionally contains an identifier for the associated public key, wherein identifiers for public keys belonging to known recipients are statistically unique, and identifiers for public keys belonging to anonymous recipients are not statistically unique. Next, the system attempts to match a candidate public key held by the recipient with key identifier in the recipient block. If the candidate public key matches a key identifier, the system decrypts the associated encrypted session key using an associated private key to restore the session key, and then decrypts the message body using the session key. The system then examines a checksum in the message body to verify that message body was correctly decrypted.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is a to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Transmission of Email Message

Figure 1:
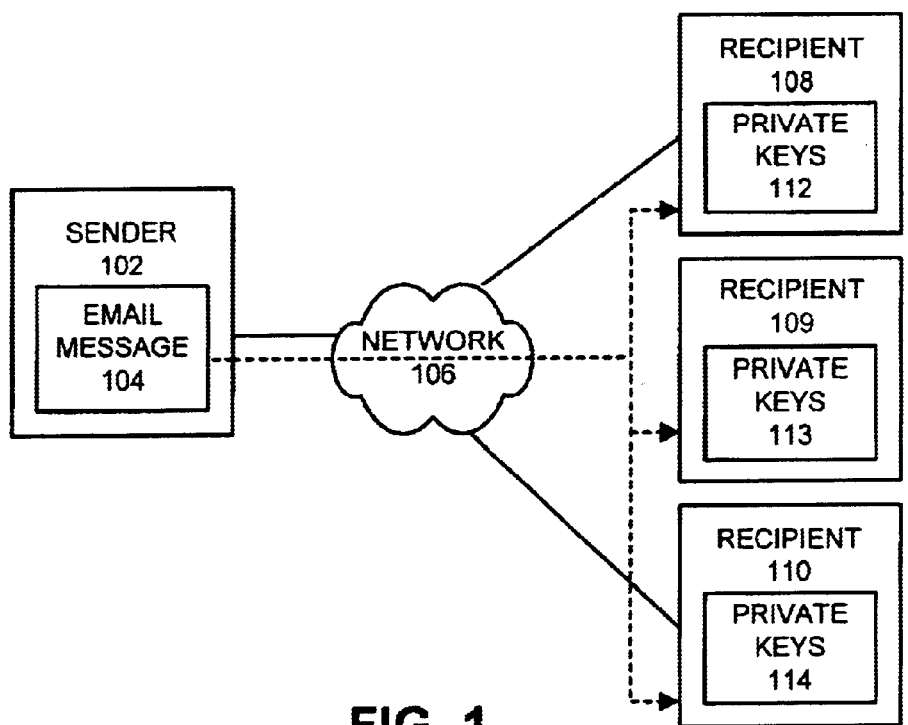
FIG. 1 illustrates the transmission of an email message from a sender to recipients across a network in accordance with an embodiment of the present invention.

FIG. 1 illustrates the transmission of an email message 104 from a sender 102 to recipients 108–110 across a network 106 in accordance with an embodiment of the present invention. Network 106 can include any type of wire or wireless communication channel capable of coupling together computing nodes. This includes, but is not limited to, a local area network, a wide area network, or a combination of networks. In one embodiment of the present invention, network 106 includes the Internet.

Sender 102 can include any type of computing system that can send an email message, while recipients 108–110 can include any type of computing systems that can receive an email message.

Recipients 108–110 hold private keys 112–114, respectively. These private keys 112–114 enable recipients 108–110 to decrypt email messages that have been encrypted with corresponding public keys.

Note that knowledge of a public key cannot be used to decrypt a message encrypted with the public key. The corresponding private key must be used, and this private key is typically kept in secrecy by recipients 108–110.

The system illustrated in FIG. 1 operates generally as follows. Sender 102 produces an email message, the body of which is encrypted with a session key. This session key is encrypted with the public key of each of the recipients. Next, the encrypted message and the encrypted session key are sent to recipients 108–110across network 106. Recipients 108–110 use their private keys 112–114 to decrypt the encrypted session key, and then use the session key to decrypt the body of the email message.

Structure of Email Message

Figure 2:
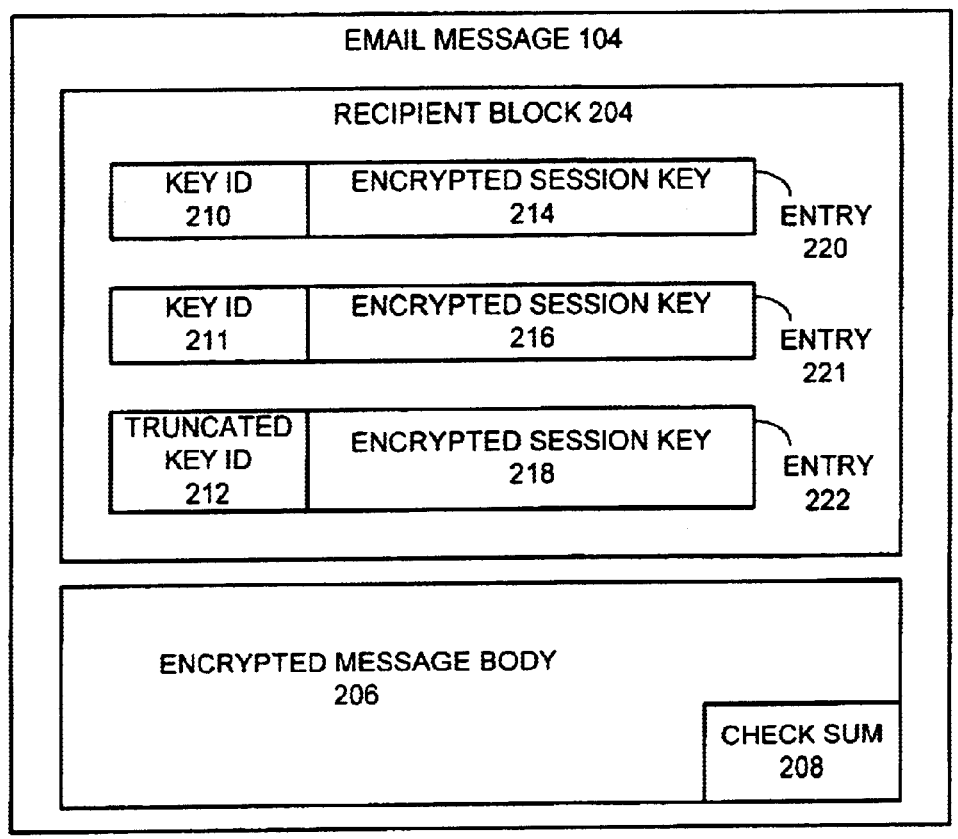
FIG. 2 illustrates the structure of an encrypted email message in accordance with an embodiment of the present invention.

FIG. 2 illustrates the structure of an encrypted email message 104 in accordance with an embodiment of the present invention. Email message 104 includes an encrypted message body 206 containing information to be communicated to from sender 102 to recipients 108–110. Encrypted message body 206 is created by first producing a checksum (otherwise known as a hash or a message digest) of the message body and then encrypting the message body with a session key. This session key can be randomly generated by the sender for the message.

Email message 104 also includes a recipient block 204 containing an entry for each recipient of email message 104. In FIG. 2, recipient block 204 contains three entries 220–222 for each of three recipients 108–110 of email message 104.

Each entry contains an encrypted session key and a key ID. More specifically: entry 220 contains encrypted session key 214 and key ID 210; entry 221 contains encrypted session key 216 and key ID 211; and entry 222 contains encrypted session key 218 and key ID 212.

Each encrypted session key is formed by encrypting the session key for the message with a public key belonging to a recipient so that the encrypted session key can be decrypted with a corresponding private key of the recipient. For example, if entry 220 is for recipient 108, encrypted session key 214 is formed by encrypting the session key with a public key belonging to recipient 108. This enables recipient 108 to decrypt the encrypted session key with a corresponding private key held by recipient 108.

Each key ID is formed by taking a hash of the public key that was used to encrypt the associated encrytped session key. For example, if entry 220 corresponds to recipient 108, key ID 210 is formed by taking a hash of the public key for recipient 108. Key ID 210 can then be used by recipient 108 to determine whether recipient 108 possesses the corresponding private key within private keys 112 to decrypt encrypted session key 214.

Note that key ID 210 is typically long, for example 64 bits. This ensures that key ID 210 is statistically unique—although uniqueness cannot be guaranteed because there exists an almost non-existent probability that two different public keys will result in the same 64 bit hash.

Entry 222 corresponds to an anonymous recipient 110, who cannot be identified by examining the email message. In order to protect the identity of anonymous recipient 1110, key ID 212 is truncated to a small number of bits; for example, three to six bits. In this way, key ID 212 cannot be used to uniquely identify anonymous recipient 110. However, anonymous recipient 110 can use the key identifier 212 to exclude a large percentage of all possible corresponding private keys 114 held by recipient 110 from matching the identifier. Hence, if anonymous recipient 110 possesses a private key to decrypt encrypted session key 218, anonymous recipient 110 must try at most a small number of its private keys to determine if it possesses the proper private key. Without truncated key ID 212, anonymous recipient 110 may potentially have to try all of its private keys 114.

Process of Generating an Encrypted Email Message

Figure 3:
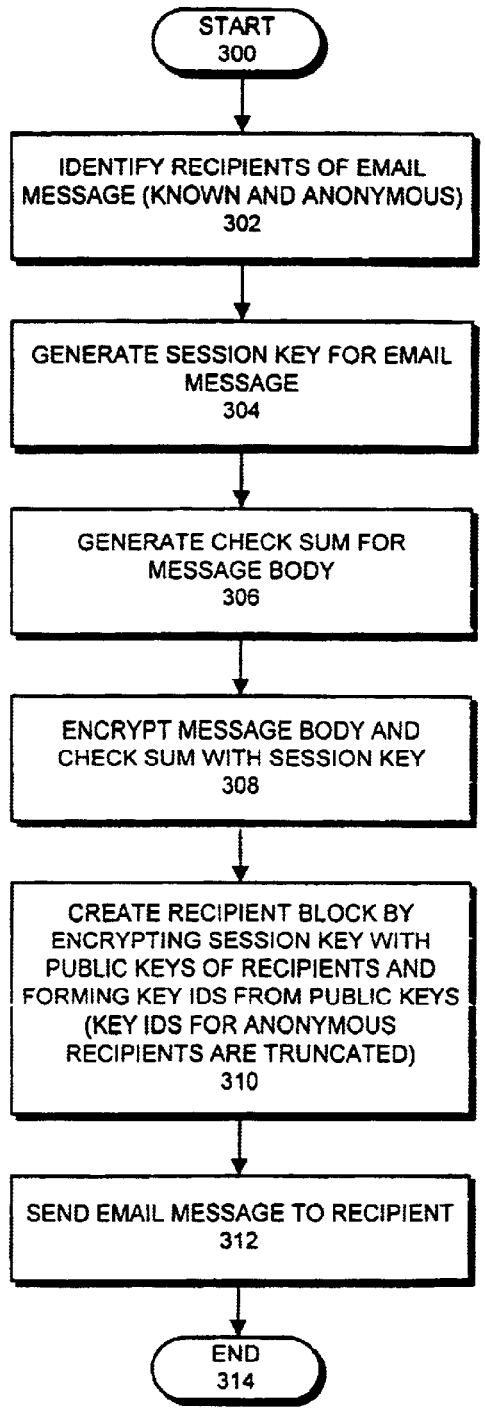
FIG. 3 is a flow chart illustrating the process of generating an encrypted email message at a sender in accordance with an embodiment of the present invention.

FIG. 3 is a flow chart illustrating the process of generating an encrypted email message 104 at sender 102 in accordance with an embodiment of the present invention. The system starts by identifying recipients of email message 104 (step 302). These recipients can include known recipients, who can be identified by examining the email message, and anonymous recipients, who cannot be identified by examining the email message. The system also generates a session key for the email message (step 304). This session key can be generated randomly by sender 102.

The system additionally generates checksum 208 for the email message body using some type of hashing mechanism (step 306). The system then encrypts the message body and the checksum to form encrypted message body 206 (step 308).

The system also creates recipient block 204 for email message 104 (step 310). Each of the entries 220–222 in recipient block 204 contain the session key encrypted with a public key associated with the corresponding recipient to form an encrypted session key. This ensures that only a corresponding private key held by the recipient can be used to decrypt the encrypted session key.

Each entry additionally contains an identifier for the associated public key, so that each recipient can determine whether the recipient possesses a corresponding private key that can decrypt the encrypted session key. These identifiers are constructed so that identifiers for public keys belonging to known recipients are statistically unique, for example by using a hashing mechanism. Identifiers for public keys belonging to anonymous recipients are modified so that they are not statistically unique; for example by truncating the hash to a small number of bits. Finally, the system sends the email message to the recipients (step 312).

Process of Decrypting an Encrypted email Message

Figure 4:
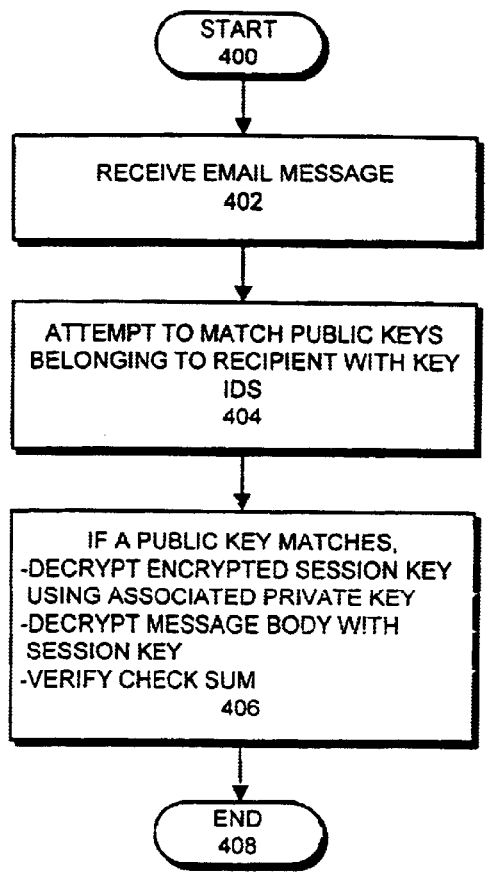
FIG. 4 is a flow chart illustrating the process of decrypting an encrypted email message at a recipient in accordance with an embodiment of the present invention.

FIG. 4 is a flow chart illustrating the process of decrypting an encrypted email message 104 at a recipient 110 in accordance with an embodiment of the present invention. Recipient 110 starts by receiving email message 104 generated by sender 102 (step 402). Next, recipient 110 attempts to match key IDs 210–212 (from recipient block 204 in email message 104) with public keys corresponding to the private keys 114 held by recipient 110 (step 404).

If a public key matches a key ID, for example say a public key held by recipient 110 matches truncated key ID 212, recipient 110 decrypts the corresponding encrypted session key 218 with the private key corresponding to the matching public key. This restores the session key. Recipient 110 then decrypts encrypted message body 206 using the restored session key, and then verifies that the checksum 208 is properly formed from the message body (step 406). Verifying the checksum additionally verifies that the proper private key was used to restore the session key.

If more than one public key held by recipient 110 matches a key ID in recipient block 204, recipient 110 may have to repeat this decryption and verification process for more than one public key.

The foregoing descriptions of embodiments of the invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for facilitating secure transmission of an email message to anonymous recipients without divulging the identities of the anonymous recipients, comprising:

identifying recipients of the email message, wherein the recipients can include known recipients, who can be identified by examining the email message, and anonymous recipients, who cannot be identified by examining the email message;

generating a session key for the email message;

encrypting a body of the email message with the session key;

creating a recipient block for the email message that contains an entry for each recipient of the email message;

wherein each entry in the recipient block contains the session key encrypted with a public key associated with the recipient to form an encrypted session key, so that only a corresponding private key held by the recipient can be used to decrypt the encrypted session key;

wherein each entry additionally contains an identifier for the associated public key, but different than the associated public key, so that each recipient can determine whether the recipient possesses the corresponding private key that can decrypt the encrypted session key;

wherein identifiers for public keys belonging to known recipients are statistically unique;

wherein identifiers for public keys belonging to anonymous recipients are not statistically unique; and sending the email message to the recipients.

2. The method of claim 1, wherein identifiers for public keys belonging to anonymous recipients provide only enough information to exclude a Large percentage of all possible corresponding private keys from being able to decrypt the body of the email message.

3. The method of claim 2, wherein an identifier for a public key is formed by creating a hash of the public key.

4. The method of claim 3, wherein an identifier for a public key belonging to an anonymous recipient is additionally modified so the identifier is not statistically unique;

whereby the identifier cannot be used to uniquely identify the anonymous recipient, and whereby a recipient can use the identifier to exclude a large percentage of all possible corresponding public keys held by the recipient from matching the identifier.

5. The method of claim 1, further comprising, —encrypting the body of the email message, including a checksum into the body of the email message, so that a recipient can examine the checksum to verify that the correct private key was used in decrypting the email message.

6. A method for facilitating secure transmission of an email message to anonymous recipients without divulging the identities of the anonymous recipients, comprising:

receiving the email message at a recipient, wherein the email message includes, a message body that has been encrypted with a session key, a recipient block that contains an entry for each recipient of the email message, wherein each entry in the recipient block contains the session key encrypted with a public key associated with the recipient to form an encrypted session key, wherein each entry additionally contains an identifier for the associated public key, but different than the associated public key, wherein identifiers for public keys belonging to known recipients are statistically unique, and wherein identifiers for public keys belonging to anonymous recipients are not statistically unique;

attempting to match a candidate public key held by the recipient with key identifier in the recipient block;

if the candidate public key matches a key identifier,
  decrypting the associated encrypted session key using an associated private key to restore the session key,
  decrypting the message body using the session key, and
  examining a checksum in the message body to verify that message body was correctly decrypted.

7. The method of claim 6, wherein identifiers for public keys belonging to anonymous recipients provide only enough information to exclude a large percentage of all possible corresponding private keys from being able to decrypt the message body of the email message.

8. The method of claim 7, wherein an identifier for a public key is formed by creating a hash of the public key.

9. The method of claim 8, wherein an identifier for a public key belonging to an anonymous recipient is additionally modified so the identifier is not statistically unique;
  whereby the identifier cannot be used to uniquely identify the anonymous recipient; and
  whereby a recipient can use the identifier to exclude a large percentage of all possible public keys belonging to the recipient from matching the identifier.

10. A computer-readable storage medium storing instructions that when executed by a computer cause the computer to perform a method for facilitating secure transmission of an email message to anonymous recipients without divulging the identities of the anonymous recipients, the method comprising:
  identifying recipients of the email message, wherein the recipients can include known recipients, who can be identified by examining the email message, and anonymous recipients, who cannot be identified by examining the email message;
  generating a session key for the email message;
  encrypting a body of the email message with the session key;
  creating a recipient block for the email message that contains an entry for each recipient of the email message;
  wherein each entry in the recipient block contains the session key encrypted with a public key associated with the recipient to form an encrypted session key, so that only a corresponding private key held by the recipient can be used to decrypt the encrypted session key;
  wherein each entry additionally contains an identifier for the public key, but different than the associated public key, so that each recipient can determine whether the recipient, possesses the corresponding private key that can decrypt the encrypted session key;
  wherein identifiers for public keys belonging to known recipients are statistically unique;
  wherein identifiers for public keys belonging to anonymous recipients are not statistically unique; and
  sending the email message to the recipients.

11. The computer-readable storage medium of claim 10, wherein identifiers for public keys belonging to anonymous recipients provide only enough information to exclude a large percentage of all possible corresponding private keys from being able to decrypt the body of the email message.

12. The computer-readable storage medium of claim 11, wherein an identifier for a public key is formed by creating a hash of the public key.

13. The computer-readable storage medium of claim 12, wherein an identifier for a public key belonging to an anonymous recipient is additionally modified so the identifier is not statistically unique;
  whereby the identifier cannot be used to uniquely identify the anonymous recipient; and
  whereby a recipient can use the identifier to exclude a large percentage of all possible public keys belonging to the recipient from matching the identifier.

14. The computer-readable storage medium of claim 10, wherein prior to encrypting the body of the email message, the method further comprises including a checksum into the body of the email message, so that a recipient can examine the checksum to verify that the correct private key was used in decrypting the email message.

15. A computer-readable storage medium storing instructions that when executed by a computer cause the computer to perform a method for facilitating secure transmission of an email message to anonymous recipients without divulging the identities of the anonymous recipients, the method comprising:
  receiving the email message at a recipient, wherein the email message includes,
    a message body that has been encrypted with a session key,
    a recipient block that contains an entry for each recipient of the email message,
    wherein each entry in the recipient block contains the session key encrypted with a public key associated with the recipient to form an encrypted session key,
    wherein each entry additionally contains an identifier for the associated public key, but different than the associated public key,
    wherein identifiers for public keys belonging to known recipients are statistically unique, and
    wherein identifiers for public keys belonging to anonymous recipients are not statistically unique;
  attempting to match a candidate public key held by the recipient with key identifier in the recipient block;
  if the candidate public key matches a key identifier,
    decrypting the associated encrypted session key using an associated private key to restore the session key,
    decrypting the message body using the session key, and
    examining a checksum in the message body to verify that message body was correctly decrypted.

16. The computer-readable storage medium of claim 15, wherein identifiers for public keys belonging to anonymous recipients provide only enough information to exclude a large percentage of all possible corresponding private keys from being able to decrypt the message body of the email message.

17. The computer-readable storage medium of claim 16, wherein an identifier for a public key is formed by creating a hash of the public key.

18. The computer-readable storage medium of claim 17, wherein an identifier for a public key belonging to an anonymous recipient is additionally modified so the identifier is not statistically unique;
  whereby the identifier cannot be used to uniquely identify the anonymous recipient; and
  whereby a recipient can use the identifier to exclude a large percentage of all possible public keys belonging to the recipient from matching the identifier.

19. An apparatus that facilitates secure transmission of an email message to anonymous recipients without divulging the identities of the anonymous recipients, comprising:
  an identifying mechanism that is configured to identify recipients of the email message, wherein the recipients can include known recipients, who can be identified by examining the email message, and anonymous recipients, who cannot be identified by examining the email message;
  a key generation mechanism that is configured to generate a session key for the email message;

an encryption mechanism that is configured to encrypt a body of the email message with the session key;

a recipient block creation mechanism that is configured to create a recipient block for the email message that contains an entry for each recipient of the email message;

wherein each entry in the recipient block contains the session key encrypted with a public key associated with the recipient to form an encrypted session key, so that only a corresponding private key held by the recipient can be used to decrypt the encrypted session key;

wherein each entry additionally contains an identifier for the associated public key, but different than the associated public key, so that each recipient can determine whether the recipient possesses the corresponding private key that can decrypt the encrypted session key;

wherein identifiers for public keys belonging to known recipients are statistically unique;

wherein identifiers for public keys belonging to anonymous recipients are not statistically unique; and a sending mechanism that is configured to send the email message to the recipients.

20. The apparatus of claim 19, wherein identifiers for public keys belonging to anonymous recipients provide only enough information to exclude a large percentage of all possible corresponding public keys from being able to decrypt the body of the email message.

21. The apparatus of claim 20, wherein an identifier for a public key is a hash of the public key.

22. The apparatus of claim 21, wherein the recipient block creation mechanism is additionally configured to modify an identifier for a public key belonging to an anonymous recipient so the identifier is not statistically unique;

whereby the identifier cannot be used to uniquely identify the anonymous recipient; and whereby a recipient can use the identifier to exclude a large percentage of all possible public keys held by the recipient from matching the identifier.

23. The apparatus of claim 19, further comprising a checksum mechanism that, wherein prior to encrypting the body of the email message, the checksum mechanism is configured to include a checksum into the body of the email message, so that a recipient can examine the checksum to verify that the correct private key was used in decrypting the email message.

24. An apparatus that facilitates secure transmission of an email message to anonymous recipients without divulging the identities of the anonymous recipients, comprising:

a receiving mechanism that is configured to receive the email message at a recipient, wherein the email message includes, a message body that has been encrypted with a session key, a recipient block that contains an entry for each recipient of the email message, wherein each entry in the recipient block contains the session key encrypted with a public key associated with the recipient to form an encrypted session key, wherein each entry additionally contains an identifier for the associated public key, but different than the associated public key, wherein identifiers for public keys belonging to known recipients are statistically unique, and wherein identifiers for public keys belonging to anonymous recipients are not statistically unique;

a matching mechanism that is configured to attempt to match a candidate public key belonging to the recipient with key identifier in the recipient block;

a decryption mechanism, wherein if the candidate public key matches a key identifier, the decryption mechanism is configured to, decrypt the associated encrypted session key using a corresponding private key to restore the session key, decrypt the message body using the session key, and to examine a checksum in the message body to verify that message body was correctly decrypted.

25. The apparatus of claim 24, wherein identifiers for public keys belonging to anonymous recipients provide only enough information to exclude a large percentage of all possible corresponding private keys from being able to decrypt the message body of the email message.

26. The apparatus of claim 25, wherein an identifier for a public key is a hash of the public key.

27. The apparatus of claim 26, wherein an identifier for a public key belonging to an anonymous recipient is additionally modified so the identifier is not statistically unique;

whereby the identifier cannot be used to uniquely identify the anonymous recipient; and whereby a recipient can use the identifier to exclude a large percentage of all possible public keys belonging to the recipient from matching the identifier.

* * * * *